INVENTORS
Robert B. Costello &
BY Gilbert B. Graham

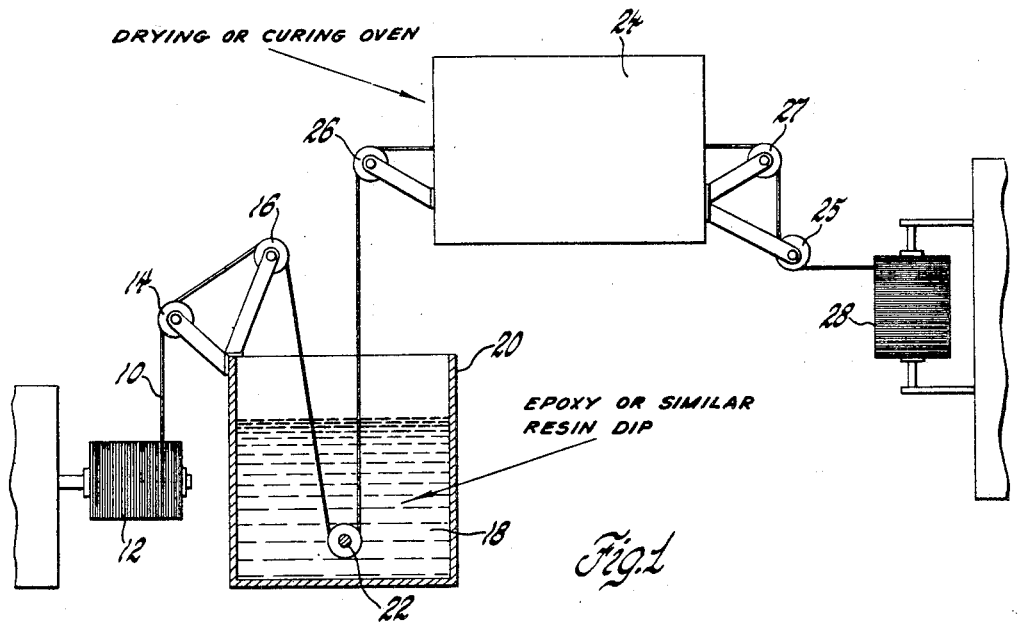
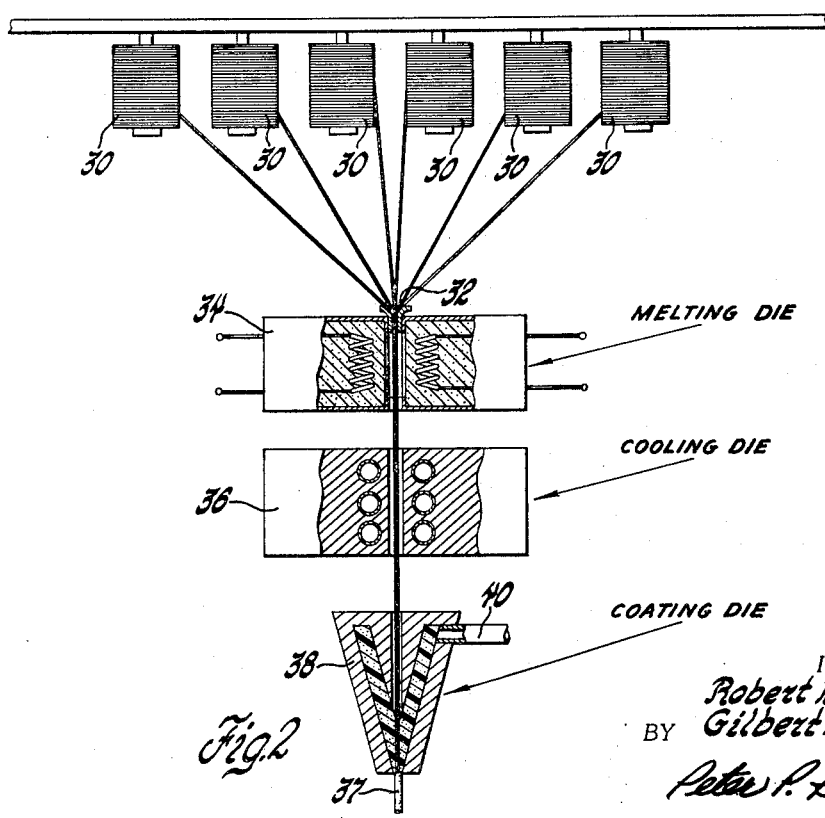

ATTORNEY

United States Patent Office 3,496,717
Patented Feb. 24, 1970

3,496,717
METHOD OF MAKING A GLASS TEXTILE STRAND PRODUCT
Robert B. Costello, Birmingham, Mich., and Gilbert Beatte Graham, Santa Barbara, Calif., assignors to General Motors Corporation, Detroit, Mich., a corporation of Delaware
Original application Apr. 2, 1965, Ser. No. 445,160, now Patent No. 3,371,476, dated Mar. 5, 1968. Divided and this application Nov. 29, 1967, Ser. No. 686,441
Int. Cl. D02g 3/36
U.S. Cl. 57—164                             6 Claims

ABSTRACT OF THE DISCLOSURE

A method of making a glass textile strand product including the steps of impregnating a glass fiber roving with a stage B thermosetting resin; heating and compacting a plurality of the resin impregnated rovings to melt the stage B resin sufficiently to cause the rovings to fuse together to form a single strand; cooling the strand whereby the melted stage B resin is solidified and caused to revert to its relatively brittle uncured state; coating the resultant strand with a heat resistant lubricant material; heating a plurality of lubricant coated strands sufficiently to cause the thermosetting resin to soften sufficiently to render the strands pliable; twisting the plurality of strands to form a cable; and heating the twisted cable for a time and temperature sufficient to effect a substantially complete cure of the thermosetting resin whereby the strands assume a permanently twisted configuration.

---

This is a division of patent application S.N. 445,160, filed Apr. 2, 1965, now Patent No. 3,371,476, Robert B. Costello and Gilbert B. Graham, assigned to the assignee of the parent application.

This invention relates to a method of making structural tension members such as ropes, cables, and the like and more particularly to a method of making a rope-like composite structure formed of fiberglass strands associated with synthetic resins.

Rod-like structures of glass fibers monolithically bonded with synthetic resins are well known. However, these prior art structures are rigid and cannot be bent on any reasonable radius nor can they be manufactured in long continuous lengths. Various rope-like constructions employing glass fibers with various synthetic resin coatings have also been described in the prior art; however, these constructions are not sufficiently strong and durable as a replacement for steel wire rope.

Because of its relatively great tensile strength, fiberglass yarn or cord has advantages over other yarn or cord where that quality is desired, but it has a serious disadvantage of being relatively non-flexible, or brittle. This characteristic limits the angle or radius of curvature through which the yarn or cord may be bent, twisted, or flexed before the individual filaments and cord fibers in the yarn or cord break.

It is, accordingly, the basic object of this invention to provide a rope or cable-like structure consisting essentially of a multiplicity of continuous glass filaments associated with synthetic resins to provide a structure of improved flexibility and very high tensile strength.

It is a further object of this invention to provide a method for making a fiber glass synthetic resin composite rope having markedly improved flexibility and a high tensile strength.

These and other objectives are accomplished by a process in which a plurality of glass fiber rovings are first impregnated with the brittle heat curable stage B type thermosetting resin such as, for example, the novalac forms of a phenolic or polyepoxide resin together with a suitable catalyst. The rovings are then heated sufficiently to melt the stage B resin and passed through a die to compact the rovings and cause them to fuse together to form a single strand. The strand is then cooled to prevent the stage B resin from passing into the thermoset infusible C stage and it reverts to its relatively brittle substantially uncured state. Next, the resultant strand is coated with a temperature-resistant lubricant coating such as, for example, a silicone resin. Thereafter, a plurality of the aforementioned strands are heated to cause the stage B resin therein to soften sufficiently to cause the strands to become pliable and the strands are then twisted together to form a cable-like structure. The twisted cable is then heated at a temperature and for a time sufficient to effect a substantially complete cure of the thermosetting resin. As a result, the strands assume a permanently twisted configuration while the lubricant coating between the strands is operative to prevent bonding of the strands to one another. The resulting rope-like structure has a high tensile strength and a high degree of flexibility; since, on bending or flexing the cable, the individual strands are permitted to slip past one another.

Other objects and advantages will be apparent from the following detailed description of the invention, reference being had to the accompanying drawings in which:

FIGURE 1 is an elevation view shown schematically of the apparatus for impregnating glass fiber rovings with the stage B thermosetting resin;

FIGURE 2 is an elevation view of apparatus shown schematically and in partial cross-section for fusing the rovings into strands and coating them with a lubricant material;

FIGURE 3 is a perspective view of apparatus for twisting the strands into a cable-like structure and curing the stage B resin impregnant;

Figures 4, 5, 6, 7:
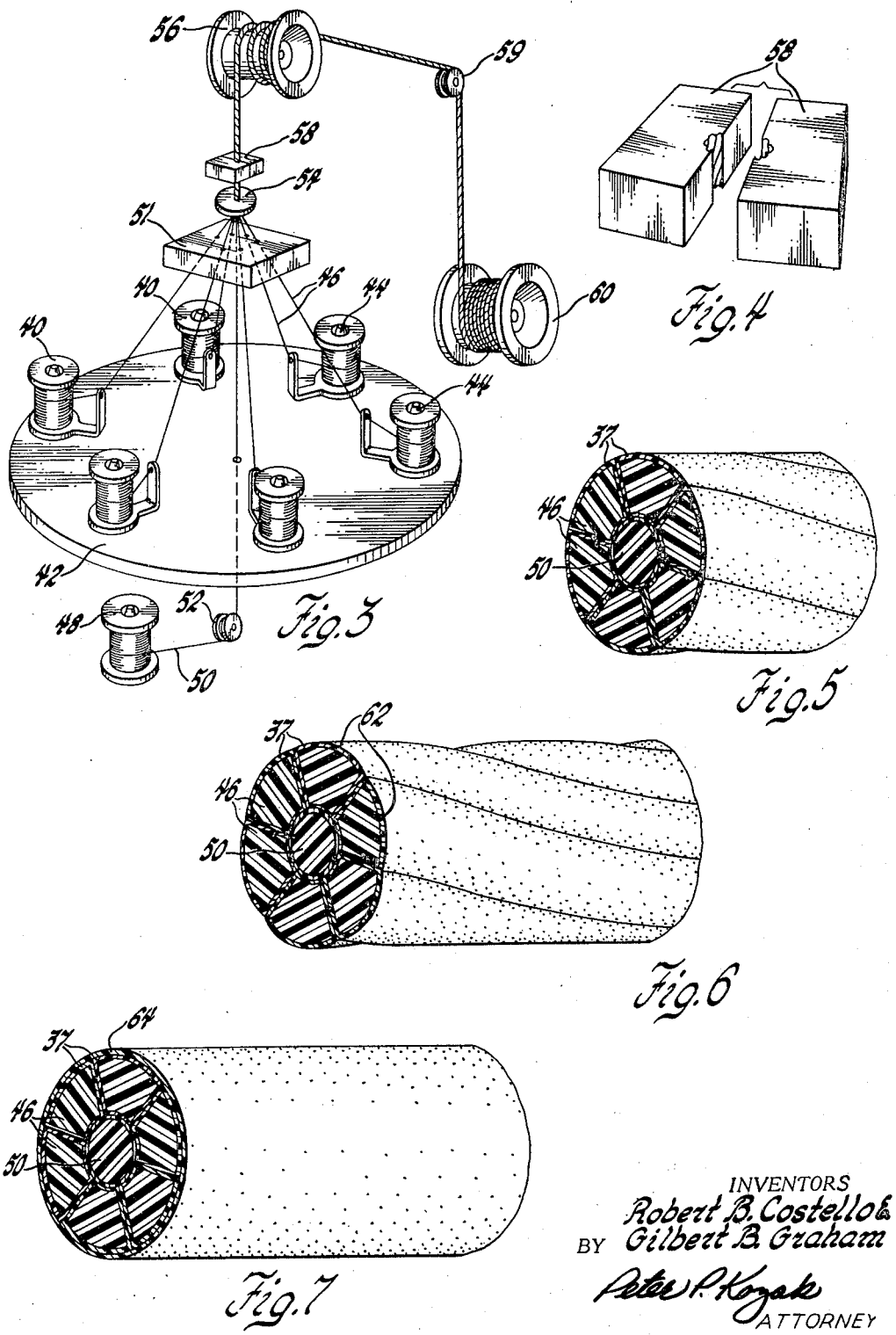
FIGURE 4 is a perspective view of a convoluted die.
FIGURE 5 is a perspective cross-sectional view of one form of the cable-like glass fiber structure made in accordance with this invention.
FIGURE 6 is a perspective cross-sectional view of another form of cable-like glass fiber structure made in accordance with the invention.
FIGURE 7 is a prespective cross-sectional view of another embodiment of the invention.

Referring now to FIGURE 1 of the drawings, the glass fiber cable of this invention is made by a process in which glass fiber rovings are first impregnated with a stage B thermosetting resin. The term "roving" as used herein refers to a group of ends which may be in parallel to one another or twisted. The term "end" refers to a filament which is a solid glass rod of very small diameter having high tensile strength. The term "stage B resin" is used herein in a conventional sense and refers to the intermediate form of a thermosetting resin in which state it is thermoplastic but which upon being heated at appropriate temperatures for a sufficient time, will convert to a thermosetting or C stage in which condition the resin is substantially infusible. This stage B resin is that commonly referred to as a novalac, particularly in reference to resin such as phenolic and polyepoxide type resins. Various thermosetting resins may be used to impregnate the rovings in accordance with this invention. For example, the novalac or stage B form of phenol-formaldehyde resin together with a suitable catalyst such as hexamethylenetetramine may be used as well as other phenolic thermosetting resins in which other aldehydes and phenols form precursor constituents as is well known in the art.

Preferably, the stage B resin impregnant is a polyepoxide resin such as the reaction product of bis-phenol A and epichlorohydrin which may be described as a diglycidyl ether of bis-phenol A or bis (4-hydroxy phenyl)dimethylmethane commercially available under the trade name of "Epon 828" produced by the Shell Oil Company. This resin has a viscosity at 77° F. of 135–195 poises, an epoxide equivalent of 185–205 and an average molecular weight of 350-400.

Another polyepoxide resin illustrative of suitable stage B resins which may be used is the CIBA Products Araldite 9200, which is likewise a polyfunctional epoxy novalac based on phenol and has an epoxide equivalent of 176–181.

Various curing or cross-linking agents well known in the art may be used. Examples of suitable curing agents include acid anhydrides such as the hexahydrophthalic anhydride, pyromellitic dianhydride, and the methylated maleic adduct of phthalic anhydride. Various amine types curing agents and particularly Borontrifluoride monethylamine may be used. As will be apparent from the following description of the process, the particular stage B resin and curing agent to be used is preferably chosen so that the curing rate thereof is relatively slow at temperatures near to the melting point of the stage B resin. In other words, the melting point of the stage B resin should be at a temperature significantly below that temperature at which the cross-linking or curing will occur at an appreciable rate.

As may be seen with reference to FIGURE 1, a glass fiber roving 10 preferably untwisted and suitable for resin impregnation is unwound from a spool 12, passed over suitable pulleys 14 and 16 and thence into a solvent solution 18 of the stage B thermosetting resin contained in a tank 20. In the specific example described herein, the stage B thermosetting resin is the aforementioned Epon 828 polyepoxide resin in a methylethyl ketone solvent together with the methyl nadic anhydride curing agent. Other suitable solvents such as diacetone alcohol may be used. The roving 10 is passed through the resin solution 18 under the pulley 22 and from thence through a drying oven 24 over the pulleys 26 and 27.

The drying oven is preferably maintained at a temperature of about 1200° F. The individual filaments of the roving passes through the resin tank 20 and, as it passes through the drying oven at a rate of about 50 to 75 feet per minute, the solvent is removed by evaporation and the stage B resin is permitted to cure somewhat so that on leaving the drying oven, it is in a dry and brittle form. It is desirable at this stage to advance the cure of the resin sufficiently so that it is dry and not sticky. The solids content of the resin solution and the rate at which the roving passes through the solution is preferably such that the resin content in the dry impregnated roving on a weight basis is about 17 to 22%. This resin content is maintained so that the filaments of the roving are coated for maximum strength and so that the resin will not bleed from the strands subsequently formed during the subsequent heating and processing. The dried roving then passes under the pulley 25 and is wound tonto a spool 28.

Next, a plurality of spools of the stage B resin impregnated rovings 30 are then suitably mounted as shown in FIGURE 2. The rovings from each spool are then brought together and passed through an orifice 32 of the heated die 34. The orifice 32 is suitably contoured at its inlet end to permit the rovings to pass through the die orifice smoothly and be compacted together. As the compacted rovings pass through the die, the stage B resin impregnant is heated sufficiently to cause the resin to fuse and the rovings to bond together to form a single strand. Die temperatures of 200° to 400° F. may be used depending on the length of the heating zone in the die. Although the heating of the rovings is conveniently performed by the heated die 34, the rovings may be heated prior to their entry into the die by subjecting them to a blast of hot air or other suitable heating means. The fused rovings or strand is then passed through the cooling die 36 to prevent a cure of the stage B resin to its infusible stage. In other words, after the fused rovings or strand leaves the die 34, the cure of the thermosetting resin is halted and the resin is caused to revert to its substantially brittle uncured state. By a suitable selection of stage B resin and curing agent, the cure rate of the resin shown leaving the die 34 is sufficiently slow so that the cooling step may be performed by the mere exposure of the strand to substantially room temperature environment. This may be effected by permitting the strand to travel through a room temperature environment for a suitable time after leaving the fusion die 34. Thereafter the fused rovings or strand then is coated with a heat-resistant lubricant coating 37 by means of the extrusion die 38. The lubricant material is fed into the extrusion die 38 through the orifice 40 wereby a coating of the lubricant material is formed on the strand surface as shown. Preferably, the lubricant material is a silicone fluid such as dimethylsiloxane known commercially as silicone L–45 produced by the Union Carbide Corporation. Other heat-resistant materials may be used having a lubricating and heat-resistant property such as polyurethane resins which is a reaction product of an organic diisocyanate, a polyhydric alcohol and polyalkylene glycol, well known in the art. It will of course be understood that the resin impregnated rovings are drawn through the apparatus shown in FIGURE 3 by means of a suitabe drive pulley, not shown.

The lubricant coated strands are now twisted together to form the cable-like structure of this invention. FIGURE 3 of the drawings illustrates suitable apparatus for performing this step of the process which is a well-known planetary cabling machine which operates to twist or helically wind strands together without twisting the strands themselves. The lubricant coated strands which have been wound on suitable spools 40 are mounted on shafts 44 mounted on the rotatable table 42. These shafts are located radially equidistant from the center of the table and equidistant from one another. The shafts 44 are the table 42 are operated by a planetary drive (not shown) in a manner such that as the table rotates in a counterclockwise direction as indicated, the strands 46 passing from the spools to the winding site will not themselves twist. Another spool of the lubricant coated strand 48 is suitably mounted so that a strand 50 therefrom passes around the pulley 52, through a centrally disposed opening in the table 42.

In the cable forming operation the strands 46 payed out from the spools 40 and the central strand 50 are drawn by the pulley 56 through hot air or other suitable heater 51 wherein the strands are heated to a soft pliable state. Thereafter, the strands 46 are helically and snugly wound without twisting the individual strands about and advanced up the length of the central strand 50 as the table 42 is rotated in the counterclockwise direction. The wound strands are then passed into the closing die 54 heated to at least the softening temperature of the stage B resin wherein the strands are deformed by extrusion about the central or core strand. Preferably, the resulting cable is again air-cooled before the cure of the resin has advanced to the thermoset stage and wound onto the driven spool 60 over the idler pulley 59. Subsequently, the cable is passed through an elongated furnace such as the furnace 24 of FIGURE 1 heated to a temperature in excess of 500° F. and retained therein for a time sufficient to effect a substantially complete cure of the resin whereby it is converted to the thermoset or infusible C stage. Of course, if desired, the cable may be heated and completely cured directly after the cabling operation described in connection with FIGURE 3.

During the winding and heating operation in the die 54, the individual wound or twisted strands assume a permanently wound or twisted configuration although the rovings in the strands maintain a parallel relation to the rovings of the other twisted strands. Moreover, the strands are not bonded to one another due to the lubricant heat-resistant coating on each strand so that when the cable is flexed or bent, the individual twisted strands may slide relative to one another so as to permit a high degree of flexibility without impairing the tensile strength of the group of strands. As previously indicated, the lubricant coating 37 may be any material which will withstand the resin curing temperatures of 500° F. or more, which will prevent any bonding of the strands during their cure and which will serve a lubricating function in the final product to facilitate movement of the strands relative to each other when the cable is flexed. Besides those mentioned, the fluorinated resins, such as polytetrafluorethylene, are suitable since they have the aforementioned desirable properties.

FIGURE 5 of the drawings shows the structure of the cable in cross-section. It will be noted that the central strand 50 retains its general cylindrical shape, whereas the twisted strands 46 are deformed as the wound cable passes through the die so as to form shapes which may be described as sectors of an annulus about the core strand 50. It will be noted that no significant voids occur between the individual strands and the lubricant coating 37. The thickness of the coating 37 has been shown of a somewhat exaggerated thickness for illustrative purposes particularly when formed of a material such as dimethylsiloxane.

Where the orifice of the die 54 is cylindrical in shape, the shape of the rope is likewise cylindrical or rod-like, as shown in FIGURE 4. However, the cable structure may be formed to have a rope-like appearance optionally by interposing the floating convoluted die 58 as shown in the detail of FIGURE 4 which is merely carried by the cable at a suitable point above the closing die 54. The orifice is suitably convoluted so that the outer portions 62 of the twisted strands are rounded to a more or less cylindrical configuration as in FIGURE 6.

In some instances it has been found desirable to provide a suitable sheath 64 of elastomeric material about the rope or cable structure as shown in FIGURE 7. The elastomeric sheath 64 may be conveniently applied by the extrusion process such as the extrusion device 38 shown in FIGURE 2. The elastomeric sheath may be formed of any of the well-known elastomers such as natural rubber, butadiene-styrene copolymers, butadiene-acrylonitrile copolymers, butyl rubber, polychloroprene, mixtures of these materials, polyurethane resins of the elastomeric type, various flexible vinyl resins, and similar elastomeric compositions. The elastomeric material in uncured form is applied to the cable as indicated and subsequently heated to effect a cure thereof.

Since the cable of this invention has a specific gravity of approximately 2.0 to 2.2, the cable has a particular usefulness in hydrospace applications since the densities of 7.5 to 7.9 of various steel cables presently in use place definite limits on depths at which ships or other floating objects can be securely anchored. The electrical properties of the cable make it particularly useful for use as antenna guide wires without the need of complicated and costly insulator devices which are required where metal wire ropes are presently used. Further, the central strand 50 may be replaced by electrical wire conductors or the like whereby the cable of this invention may additionally serve as an insulated conduit means, particularly when the cable is provided with an elastomeric sheath as shown in FIGURE 7. In some instances where heavier cable is desired, a second layer of wound strands twisted in the opposite direction may be applied. Also, the core strand 50 of FIGURE 4 may be omitted and each of the strands may be twisted and thermoset in accordance with this invention to provide useful rope-like products.

It will, of course, be appreciated that a variety of tensioned devices, not shown in the drawings, may be necessary to provide for smooth and efficient operation of the apparatus shown.

While the invention has been described in terms of a specific embodiment, it is to be understood that other forms may be adapted within the spirit and scope of the invention.

We claim:

1. A method for producing a fibrous glass textile strand product comprising the steps of impregnating a glass fiber roving with a stage B thermosetting resin, heating and compacting a plurality of the resin impregnated rovings to melt the stage B resin sufficiently to cause the said rovings to fuse together to form a single strand, cooling the strand whereby the melted stage B resin is solidified and caused to revert to its relatively brittle uncured state, coating the resultant strand with a heat-resistant lubricant material, heating a plurality of the lubricant coated strands sufficiently to cause the thermosetting resin to soften sufficiently to cause the said strands to become pliable, twisting a plurality of said strands to form a cable and heating the twisted cable for a time and temperature sufficient to effect a substantially complete cure of the thermosetting impregnant resin whereby the said strands assume a permanently twisted configuration, said lubricant being operative to prevent said strands from bonding to one another during said twisting and curing operation.

2. A method for producing a fibrous glass textile strand product comprising the steps of impregnating a glass fiber roving with a stage B thermosetting resin, heating a plurality of the resin impregnated rovings and passing them through a die to melt the stage B resin sufficiently to cause the said rovings to fuse together and compact them to form a single strand, cooling the strand whereby the melted stage B resin is solidified and caused to revert to its relatively brittle uncured state, coating the resultant strand with a heat-resistant lubricant material, heating a plurality of the lubricant coated strands sufficiently to cause the thermosetting resin to soften and said strands to become pliable, twisting said strands to form a cable, passing said cable through a die whereby the twisted strands are deformed so that the strands engage one another snugly and voids between the strands are substantially eliminated, heating the cable for a time and at a temperature sufficient to effect a substantially complete cure of the thermosetting impregnant resin whereby the said strands assume a permanently twisted configuration, said lubricant being operative to prevent such strands from bonding to one another during said twisting and curing operation.

3. A method of producing a fibrous textile product comprising the steps of heating and compacting a plurality of stage B thermosetting resin impregnated rovings to melt the stage B resin sufficiently to cause the said rovings to fuse together to form a single strand, cooling the strand whereby the melted stage B resin is solidified and caused to revert to its relatively brittle uncured state, coating the resultant strand with a heat-resistant lubricant material, heating a plurality of the lubricant coated strands sufficiently to cause the thermosetting resin to soften sufficiently to cause the said strands to become pliable, twisting a plurality of said strands to form a cable and heating the twisted cable for a time and temperature sufficient to effect a cure of the thermosetting impregnant resin whereby the said strands assume a permanently twisted configuration, said lubricant being operative to prevent said strands from bonding to one another during said twisting and curing operation.

4. A method of producing a fibrous textile product comprising the steps of heating and compacting a plurality of stage B thermosetting resin impregnated rovings to melt the stage B resin sufficiently to cause the said rovings to fuse together to form a single strand, cooling the strand whereby the melted stage B resin is solidified and caused to revert to its relatively brittle uncured state, coating the resultant strand with a heat-resistant lubricant material, heating a plurality of the lubricant coated strands sufficiently to cause the thermosetting resin to soften sufficiently to cause the said strands to become pliable, helically winding a plurality of said strands about a cylindrical core and heating the helicaly wound cable for a time and at a temperature sufficient to effect a substantially complete cure of the thermosetting resin whereby said strands assume a permanently helically wound configuration, said lubricant being operative to prevent said strands from bonding to one another and to said core during said winding and curing operation.

5. The method of claim 1 wherein said thermosetting resin is a polyepoxide resin.

6. The method of claim 1 wherein the said lubricant is a silicone material.

References Cited

UNITED STATES PATENTS

| | | | |
|---|---|---|---|
| 2,800,761 | 7/1967 | Owens | 57—164 |
| 3,309,861 | 3/1967 | Pierson et al. | |
| 3,391,052 | 7/1968 | Marzochi. | |
| 3,413,186 | 11/1968 | Marzochi | 57—164 XR |

DONALD E. WATKINS, Primary Examiner

U.S. Cl. X.R.

57—153; 65—3; 117—126